United States Patent [19]

Knobloch

[11] Patent Number: 5,401,567
[45] Date of Patent: Mar. 28, 1995

[54] MANUFACTURE OF SHAPED ARTICLES BY COMPRESSION MOLDING A FIBROUS MATERIAL WITH SIMULTANEOUS ADHESIVE BONDING AND THE SHAPED ARTICLES

[75] Inventor: Peter Knobloch, Grossaitingen, Germany

[73] Assignee: Hoechst Aktiengesellschaft, Germany

[21] Appl. No.: 63,210

[22] Filed: May 17, 1993

[30] Foreign Application Priority Data

May 15, 1992 [DE] Germany .................. 42 16 129.0

[51] Int. Cl.⁶ ............................................. B29B 11/06
[52] U.S. Cl. ................................. 428/284; 264/109; 264/122; 264/DIG. 69; 428/286; 428/287
[58] Field of Search ............... 264/109, 122, DIG. 69; 428/284, 286, 287

[56] References Cited

U.S. PATENT DOCUMENTS 3,759,775  9/1973  Shepherd .
5,098,624  3/1992  Smith et al. .................... 264/122
5,229,052  7/1993  Billiu ............................. 264/115
5,302,445  4/1994  DePetris et al. ................ 428/283

FOREIGN PATENT DOCUMENTS 2136124  2/1973  Germany .
WO91/01396  2/1991  WIPO .

*Primary Examiner*—Mary Lynn Theisen
*Attorney, Agent, or Firm*—Connolly & Jutz

[57] ABSTRACT

There is described a process for manufacturing shaped articles in which a fibrous material is mixed with an adhesive and maintained in a mold under pressure until the adhesive has set, which comprises using as the fibrous material a mixture of an essentially finely fibrous material based on synthetic fiber and of chopped monofilaments which confer the necessary hardness and stiffness on the shaped article to be manufactured, the adhesive content of the ready-produced shaped article being less than 10% by weight, based on the shaped article. The process makes it possible to manufacture shaped articles having a low adhesive content, which are repeatedly recyclable.

17 Claims, No Drawings

MANUFACTURE OF SHAPED ARTICLES BY COMPRESSION MOLDING A FIBROUS MATERIAL WITH SIMULTANEOUS ADHESIVE BONDING AND THE SHAPED ARTICLES

DESCRIPTION

The invention relates to a process for manufacturing shaped articles in which a fibrous material is mixed with an adhesive and is kept in a mold under pressure until the adhesive has set.

A process for manufacturing shaped articles is described for example in EP-B-0,160,270, where the various ways of forming such materials are also discussed. Fibrous starting materials mentioned are shoddy, wood, shavings and shredded paper residues, but with particular advantage also residues from the processing of synthetic fiber, in particular fiber made of polyethylene terephthalate, generally referred to as polyester fiber, which is used in the form of shoddy.

In the above patent specification shoddy is exemplified as polyester spunbonded residues, i.e. pulled spunbonded.

According to the claims of the above European patent specification, this fibrous material is mixed with a pulverulent mixture of a hot melt adhesive based on a copolymer of a vinyl ester and at least one further vinyl monomer, a solid epoxy resin and a hardener for the epoxy resin and the mixture is heated in a mold under pressure to a temperature at which the hot melt adhesive liquifies and the epoxy resin reacts with its hardener.

It is known that the first adhesive, based on a copolymer of a vinyl ester, confers preferentially elastic properties on the sheet thus produced. The solid epoxy resin employed as the second adhesive confers hardness on the product.

It has been found that the exclusive use of shoddy results in a large internal surface area and hence entails a high uptake of adhesive. If this material is in its turn comminuted and remolded into sheets, the adhesive content will rise rapidly. The possibility of recycling the shaped articles thus produced once more is therefore limited.

The present invention has for its object to provide a process for obtaining shaped articles of adequate strength and hardness which are recyclable one or more times. For this the invention proposes using alongside a finely fibrous material such as shoddy or comminuted polyester spunbonded residues a chop of wholly synthetic high molecular weight monofilaments. They confer on the sheet material to be manufactured sufficient stiffness that it is possible to use exclusively an adhesive system which confers cohesion and elastic properties on the sheet material and is used only in small amounts. This adhesive can be for example a hot melt adhesive, based for example on a copolymer of a vinyl ester and possibly a further vinyl monomer. In this case the sheet material gets the desired elastic properties and the cohesion as a shaped article from the adhesive and the other necessary strength properties, in particular stiffness and hardness, from the chopped monofilaments used. At the same time the adhesive content can be reduced, since the internal surface area is less.

The fibrous material used for the shaped article to be manufactured comprises two components having fundamentally different properties.

One of the components is a finely fibrous material, such as shoddy, including a comminuted spunbonded, synthetic fiber residues from the manufacturing process, from downstream processing or even from use.

The synthetic fiber can be polyester, in particular polyethylene terephthalate, polyamide or polyacrylonitrile. The term "fibrous material" is to be understood as meaning a material whose linear density is considerably below the linear density of the particular monofilament used. Typical linear density ranges for the finely fibrous material are between 1 and 10 dtex, preferably 2 to 5 dtex.

The second component comprises chopped, chaffcut, pulled synthetic monofilaments. They are preferably melt-spun monofilaments with a cross-sectional area of at least 0.01 mm$^2$, a chopped length of 3 to 30 mm and a length to diameter ratio of at least 3. Such a monofilament chop is described in German utility model DE-U-91 11 705.4. Suitable starting material for such monofilament chop arises in the manufacture of these monofilaments, in their further processing, possibly even after use. Similarly, this monofilament can also be used in the form of chopped and chaffcut monofilament fabric having a platelet area of 0.1 to 1.0 cm$^2$ and derived from textile fabrics having a basis weight of 50 to about 2000 g/m$^2$, as described in DE-U-91 11 706.2. Similarly, a mixture of these two forms of monofilament can be used. Whether the monofilaments are in the form of chaffcut fabric or in the form of loose individual monofilament chops has no significant bearing on the stiffness- and hardness-conferring properties of this monofilament component.

No restrictions apply as to the polymer systems to be used. To be able to use single-material systems, one available option is for the two components to come from the same polymer system, for example from polyethylene terephthalate.

The nature of the adhesive can be varied within wide ranges. Not only liquid adhesives but in particular pulverulent adhesives are suitable. As well as hot melt adhesives it is possible to use reactive adhesives. As regards the chemical aspect, the choice of adhesive is not subject to any restrictions. As well as adhesives based on epoxies and/or polyurethanes it is also possible to use thermoplastics, which liquefy on heating and bind the fibrous material together on cooling.

It is possible to use in particular an adhesive system which preferentially confers cohesion and elastic properties on the shaped articles formed, since the monofilament content of the fiber material confers stiffness and hardness. This is achieved for example with a hot melt adhesive based on a copolymer of a vinyl ester. The use of different adhesives and of complex multi-material systems can thus be avoided.

Preferred adhesives are customary and established products from other fields whose working temperature is below the melting temperature of the fiber materials used.

The amount of adhesive can be kept particularly low when the monofilament content is high, i.e. when the internal surface area is low. For instance, above-cited EP-B-0 160 270 mentions 80-95 parts by weight of fibrous material and 5-20 parts by weight of adhesive, preferably a weight ratio of 90:10. The present invention now makes it possible, with the high monofilament content, to reduce the adhesive content to about 5% or less, for example down into the range 3-5%. This meets in particular the desire for single-material systems and for renewed recyclability.

To manufacture the shaped articles of the invention, all the components are intimately mixed, uniformly distributed in a heatable press in accordance with the later m² weight, and heated under pressure. The temperature depends on the working temperature of the adhesive. The molding time has to be chosen in such a way that the adhesive on the inside of the article can react in full. The molding pressure and the platen spacing of the press depend on the desired thickness of the article. The stress is removed once the adhesive has developed its effect to the full. Depending on the adhesive system this can be the case for example once the temperature has dropped below a certain level.

The shaped articles of the invention can be used in a wide range of fields on account of their load-bearing properties, for example as a stabilizing sheet in the assembly of packages. They can also be used as acoustic and thermal insulating material, for example in interior decoration. They can be used in automotive construction as an insulator material and as a soundproofing material, or wherever two or more of these functions are required at the same time. This is the case for example in the building sector. These shaped articles are preferably used whenever renewed recycling is contemplated. Owing to the low adhesive content, repeated recycling will build up the proportion of the adhesive component only gradually. The low adhesive content substantially meets the requirement of a single-material system when, for example, the two fibrous components are composed of the same high polymer, for example of polyethylene terephthalate. These articles are preferably used whenever elastic properties are required from the fibrous content and/or hardness and stiffness from the monofilament content to a particular degree.

It is possible to complement the low adhesive content with an additional, water-repellent component. Commercially available additives can be chosen according to the criterion that they withstand the maximum temperature involved in the formation of the article and are miscible with the materials to be used.

What is claimed is:

1. A process for manufacturing shaped articles in which a fibrous material is mixed with an adhesive and maintained in a mold under pressure until the adhesive has set, which comprises using as the fibrous material a mixture of an essentially finely fibrous material based on synthetic fiber and of chopped monofilaments which confer the necessary hardness and stiffness on the shaped article to be manufactured, the adhesive content of the ready-produced shaped article being less than 10% by weight, based on the shaped article.

2. The process of claim 1, wherein the finely fibrous material is a shoddy based on synthetic fiber.

3. The process of claim 1, wherein the finely fibrous material comprises fiber having a linear density between 1 and 10 dtex.

4. The process of claim 1, wherein the adhesive used is a pulverulent hot melt adhesive and the fibrous material is mixed with the adhesive, heated in a mold under pressure to such a temperature that the hot melt adhesive liquefies and sets to form a solid article.

5. The process of claim 1, wherein a hot melt adhesive based on a copolymer of a vinyl ester and at least one further vinyl monomer is used.

6. The process of claim 1, wherein the proportion of monofilaments, based on the fibrous material, is 10 to 90% by weight.

7. The process of claim 1, wherein the chopped monofilaments are used in free form and/or in the form of small pieces of fabric.

8. The process of claim 2, wherein the shoddy and/or the comminuted bonded fiber web and the monofilaments are made of the same polymer.

9. The process of claim 1, wherein the fibrous material comprises polyesters.

10. The process of claim 1, wherein the adhesive comprises 2 to 10% by weight, based on the shaped article.

11. The process of claim 1, wherein the adhesive comprises 3 to 5% by weight, based on the shaped article.

12. The process of claim 1, wherein the fibrous material is mixed with an adhesive and additionally with a water-repellent component in order to counteract any ingress of water due to capillary action.

13. A shaped article obtainable from fibrous material and chopped monofilaments by the process of claim 1, wherein the proportion of monofilament is such that the monofilaments contribute essentially to the hardness and strength of the article while the finely fibrous material and the adhesive determine essentially the elastic properties.

14. The process of claim 2, wherein the finely fibrous material is a shoddy based on a comminuted bonded fiber web.

15. The process of claim 14, wherein the comminuted bonded fiber web is spunbonded.

16. The process of claim 3, wherein the fiber has a linear density between 2 and 5 dtex.

17. The process of claim 9, wherein the polyesters include polyethylene terephthalate.

* * * * *